March 19, 1940.   E. F. W. ALEXANDERSON   2,193,912
ELECTRIC VALVE CONVERTING SYSTEM
Filed May 15, 1937
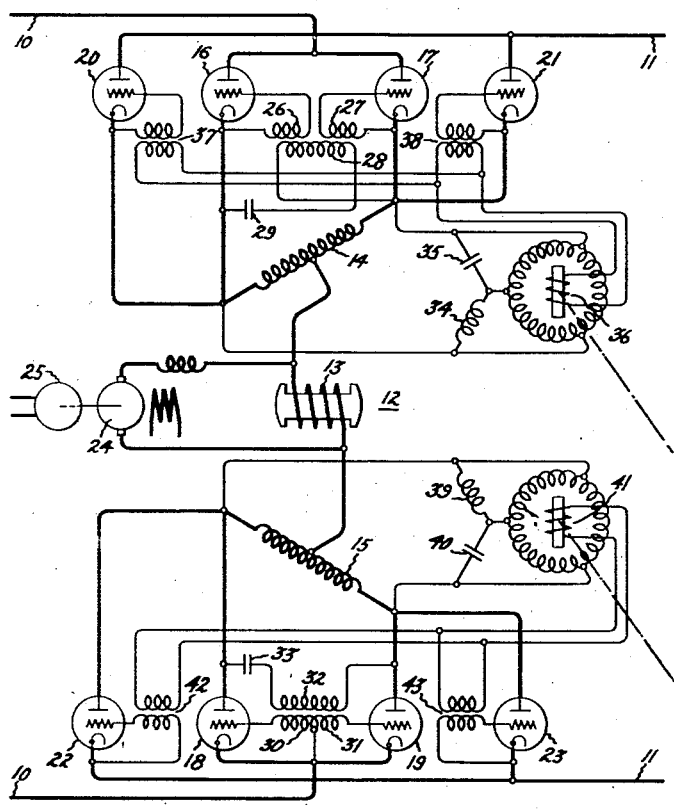
Inventor:
Ernst F. W. Alexanderson,
by Harry E. Dunham
His Attorney.

Patented Mar. 19, 1940

2,193,912

UNITED STATES PATENT OFFICE 2,193,912

ELECTRIC VALVE CONVERTING SYSTEM

Ernst F. W. Alexanderson, Schenectady, N. Y., assignor to General Electric Company, a corporation of New York Application May 15, 1937, Serial No. 142,837

10 Claims. (Cl. 171—123)

My invention relates to electric valve converting systems and more particularly to such systems suitable for transmitting energy between direct current circuits of different voltages.

Heretofore there have been proposed numerous electric valve converting systems for transferring energy between direct current circuits but such systems in general have comprised separate inverting apparatus and rectifying apparatus coupled to a common alternating current circuit. In such arrangements it has been customary generally to provide some means for supplying a commutating voltage to the inverting apparatus. In many instances it may be preferable to provide an arrangement wherein no special means for supplying such commutating voltage is required.

It is, therefore, an object of my invention to provide a new and improved electric valve converting system for transmitting energy between two direct current circuits of different voltages which will overcome some of the disadvantages of the arrangements of the prior art, and which will be simple and reliable in operation.

It is still another object of my invention to provide an improved electric valve converting system for transmitting energy between direct current circuits of different voltages whereby the amount of energy transferred between the circuits may be controlled over wide ranges while maintaining relatively high efficiency of the apparatus.

In accordance with my invention, I utilize a dynamic electric energy storage and transfer device or dynamo-electric machine, preferably of the synchronous type, which is interconnected by means of electric valves with both direct current circuits and which operates to transmit energy between circuits of different voltages. In order that the system may readily start, I provide a source of energy for supplying magnetizing or exciting current to the field winding of the dynamo-electric machine. By providing means for controlling the conductivities of the valves connected to the direct current circuit which is receiving the energy, it is possible to control the transfer of energy from zero to the maximum load rating of the apparatus.

For a better understanding of my invention, together with other and further objects thereof, reference is had to the following description taken in connection with the accompanying drawing, and its scope will be pointed out in the appended claims. In the drawing, the figure illustrates a converting system embodying my invention for transferring energy between two direct current circuits of different voltages.

Referring now more particularly to the single figure of the drawing, there is illustrated an arrangement embodying my invention for transferring energy between a constant potential direct current circuit 10 and a constant potential direct current circuit 11. This system includes a dynamic electric energy storage and transfer device or dynamo-electric machine 12 which is preferably of the synchronous alternating current type having a field winding 13 and a plurality of groups of armature windings 14 and 15. The groups of armature windings 14 and 15 are each provided with electrical neutrals between which is connected the field winding 13. The extremities of the armature phase windings 14 are each connected by means of electric valves 16 and 17 to one side of the direct current circuit 10. Similarly, each of the extremities of the armature phase windings 15 is connected by one of the valves 18 or 19 to the other side of the direct current circuit 10. Each of these same terminals of the armature phase windings 14 and 15 is connected by means of the electric valves 20, 21, 22 and 23, respectively, to the direct current circuit 11. A source of direct current potential comprising a direct current generator 24, driven by means of a motor 25 from any suitable source of current, operates to supply energy to the field winding 13 of the synchronous dynamo-electric machine to provide the necessary exciting or magnetizing current to this winding.

While each of the electric valves 16 to 23, inclusive, has been illustrated as embodying an anode, a cathode and a control grid, it is to be understood that these valves may be any of those commonly known in the art which contain an ionizable medium and are provided with a control electrode whereby the instant of conductivity may be determined. Each of the valves 16 and 17 is provided with a control or grid circuit including one of the windings 26 or 27 of a transformer the primary winding 28 of which is energized from the armature phase winding group 14 through a capacitor 29. Similarly, each of the valves 18 and 19 is energized from the control circuit including one of the transformer windings 30, 31 of a transformer, the primary winding 32 of which is energized from across the armature phase winding group 15 through a capacitor 33. A phase shifting network comprising an inductor 34 and a capacitor 35 is connected across the armature phase winding group 14 so as to supply energy to a phase shifting device 36 the secondary winding of which is connected to the primary windings of the transformers 37 and 38 which supply energy to the control circuits of the valves 20 and 21. A similar phase shifting circuit comprising an inductor 39 and a capacitor 40 is connected across the phase winding group 15 to supply energy to the phase shifting device 41, the secondary winding of which is connected to transformers 42 and 43 which supply energy to the control circuits of the valves 22 and 23. By simultaneously adjusting the phase shifters 36 and 41, the ratio of the voltage appearing across the direct current circuit 11 with respect to that of circuit 10 may be varied thereby to control the voltage appearing across the circuit 11 throughout the entire operating range from zero to the maximum voltage value.

The general principles of operation of the above described converting apparatus will be well understood by those skilled in the art and hence it is not believed necessary to set forth in great detail the operation thereof. In order to start the dynamo-electric machine or motor 12 from the standstill position, some means for obtaining commutation must be provided and any of the numerous expedients well known in the art may be used, of which the following are deemed to be suitable. A harmonic commutation system may be included between the anodes of the valves 16 and 17 and the valves 18 and 19, which generally comprises an inductor plus a capacitor. The motor may also be started from standstill by use of adjustable resistors connected in the direct current line 10. Still another arrangement for starting the motor may comprise an auxiliary motor connected to the shaft of the dynamo-electric machine 12 so as to rotate the field slowly, thereby producing sufficient counter-electromotive force to commutate the current between the valves. Still another method may be used such as shown in United States Letters Patent No. 2,130,890, granted September 20, 1938, upon the application of A. H. Mittag and assigned to the same assignee as the present application. After the motor 12 has begun to rotate the operation will be as follows: Briefly, the electric valves 16, 17, 18 and 19 operate in proper sequence to transmit unidirectional current impulses through a portion of each of the armature phase windings 14 and 15 through the field winding 13. The unidirectional current impulses supplied to the dynamo-electric machine 12 cause rotation of the field winding 13 so that the necessary counter-electromotive forces are generated to cause current to commutate between the valves of the groups of valves 16, 17 and 18, 19. The electromotive forces generated in the dynamo-electric machine due to the impulses supplied thereto from the direct current circuit 10 are impressed on the terminals of the electric valves 20 to 23 which operate to rectify these potentials and to supply direct current energy to the direct current circuit 11. The amount of energy thus transferred is controlled by controlling the conductivities of these valves by means of the phase shifting devices 36 and 41. While I have shown the dynamo-electric machine 12 as comprising a quarter-phase synchronous machine, it will, of course, be understood by those skilled in the art that any other type of dynamic electric energy storage and transfer device including a synchronous machine of any number of phases may be utilized as the magnetic link of the electric valve converting apparatus disclosed.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangements and in the instrumentalities employed without departing from the spirit and scope of my invention as set forth in the appended claims.

What I claim as new and desire to secure by Letters Patent of the United States is:

1. An electric valve converting system for transferring energy between two direct current circuits of different potentials comprising a synchronous dynamo-electric machine provided with an armature winding, a plurality of electric valves interconnecting said winding with one of said circuits to supply power thereto and a plurality of electric valves interconnecting said winding with the other of said circuits to transmit current from said machine to said circuit.

2. An electric valve converting system for transferring energy between two constant potential direct current circuits comprising a synchronous dynamo-electric machine provided with armature windings, a group of electric valves interconnecting said windings with one of said circuits to supply power thereto, a second group of electric valves interconnecting said machine with the other of said circuits to transmit current from said windings to said circuit, and means for controlling the conductivities of said last mentioned group of valves thereby to control the power output of said system.

3. An electric valve converting system for transferring energy between two direct current circuits comprising a dynamo-electric machine provided with a plurality of armature windings and a field winding, a group of electric valves interconnecting said armature windings with one of said direct current circuits for receiving energy therefrom, a second group of electric valves interconnecting said armature windings with the other of said circuits to transmit current from said machine to said circuit, means for supplying exciting current to said field winding, and means for controlling the conductivities of said valves.

4. An electric valve converting system for transferring energy between two constant potential direct current circuits comprising a dynamo-electric machine provided with a plurality of armature windings and a field winding, means for connecting said armature windings to said field winding in series relation, a group of electric valves interconnecting said armature windings with one of said direct current circuits for receiving energy therefrom, a second group of controlled electric valves interconnecting said armature windings with the other of said circuits to transmit current from said machine to said circuit, means for supplying magnetizing current to said field winding, and means for controlling the conductivities of said last mentioned group of valves.

5. An electric valve converting system for transferring energy between two constant potential direct current circuits comprising a dynamo-electric machine provided with a plurality of groups of armature windings and a field winding connected therebetween, a plurality of electric valves arranged to connect said dynamo-electric machine across one of said direct current circuits, means for supplying magnetizing current to said field winding, a plurality of controlled electric valves interconnecting said armature windings with the other of said direct current circuits, and means for controlling the conductivities of said last mentioned electric valves.

6. An electric valve converting system for transferring energy between two constant potential direct current circuits comprising a dynamo-electric machine provided with a field winding and a plurality of groups of armature windings each provided with an electrical neutral means connecting said field winding between the neutrals of said armature windings, a source of energy for supplying magnetizing current to said field winding, a group of electric valves interconnecting the terminals of said groups of armature windings with one of said direct current circuits, a second group of controlled electric valves interconnecting the terminals of said group of armature windings with the other of said direct current circuits, and means for controlling the conductivities of said electric valves thereby to control the transfer of energy between said direct current circuits.

7. An electric valve converting system for transferring energy between two constant potential direct current circuits comprising a dynamic electric energy storage and transfer device, a group of electric valves interconnecting said device with one of said circuits to supply power thereto, a second group of electric valves interconnecting said device with the other of said circuits to transmit current from said device to said circuit, and means for controlling the conductivities of said last mentioned group of valves thereby to control the power output of said system.

8. An electric valve converting system for transferring energy between two constant potential direct current circuits of different potentials comprising a dynamic electric energy storage and transfer device, a plurality of electric valves interconnecting said device with one of said circuits to supply power thereto, and a plurality of electric valves interconnecting said device to the other of said circuits to transmit current from said device to said circuit.

9. The combination comprising a constant potential direct current circuit, a plurality of electric valves each connected to a different one of the conductors of said circuit, a dynamic electric energy storage and transfer device connected between the valves of said conductors, a second constant potential direct current circuit, a plurality of valves for each of the conductors of said circuits, means for connecting said valves to said dynamic electric energy storage and transfer device, and means for controlling the conductivities of said valves.

10. An electric valve converting system for transferring energy between two constant potential direct current circuits comprising a dynamic electric energy storage and transfer device, a group of electric valves interconnecting said device with one of said direct current circuits for receiving energy therefrom, a second group of electric valves interconnecting said device with the other of said circuits for transmitting current from said device to said circuit, means for deriving control potentials for said valves from said energy storage and transfer device, and means for varying the conductivities of said latter group of valves to control the power output of said system.

ERNST F. W. ALEXANDERSON.